(12) United States Patent
Abe et al.

(10) Patent No.: US 8,139,868 B2
(45) Date of Patent: Mar. 20, 2012

(54) IMAGE PROCESSING METHOD FOR DETERMINING MATCHING POSITION BETWEEN TEMPLATE AND SEARCH IMAGE

(75) Inventors: Yuichi Abe, Mito (JP); Mitsuji Ikeda, Hitachinaka (JP); Yoshimichi Sato, Hitachi (JP); Yasutaka Toyoda, Hitachi (JP)

(73) Assignee: Hitachi High-Technologies Corporation, Tokyo (JP)

( * ) Notice: Subject to any disclaimer, the term of this patent is extended or adjusted under 35 U.S.C. 154(b) by 791 days.

(21) Appl. No.: 12/194,763

(22) Filed: Aug. 20, 2008

(65) Prior Publication Data
US 2009/0087103 A1  Apr. 2, 2009

(30) Foreign Application Priority Data
Sep. 28, 2007 (JP) ................. 2007-254610

(51) Int. Cl.
*G06K 9/62* (2006.01)

(52) U.S. Cl. ..................................... 382/209

(58) Field of Classification Search ............ 382/209
See application file for complete search history.

(56) References Cited

U.S. PATENT DOCUMENTS

| | | | |
|---|---|---|---|
| 6,073,041 A * | 6/2000 | Hu et al. | 600/410 |
| 7,082,225 B2 * | 7/2006 | Endo et al. | 382/291 |
| 2004/0208341 A1 * | 10/2004 | Zhou et al. | 382/103 |
| 2005/0281454 A1 * | 12/2005 | Miyashita | 382/145 |
| 2007/0031026 A1 * | 2/2007 | Kurihara et al. | 382/149 |

FOREIGN PATENT DOCUMENTS

| | | |
|---|---|---|
| JP | 61-98483 A | 5/1986 |
| JP | 2003-85565 A | 3/2003 |

OTHER PUBLICATIONS

Chan et al., Experiments on block-match techniques for video coding, Multimedia Systems, 1994, vol. 2, pp. 228-241.*
Nagashima, S. et al., "A Scale Algorithm Based on Phase-Only Correlation for Electron Microscope Images", IEICE Technical Report, Jun. 2005, pp. 19-24, SIP2005-42.

* cited by examiner

*Primary Examiner* — David Zarka
(74) *Attorney, Agent, or Firm* — Crowell & Moring LLP

(57) ABSTRACT

An inspection apparatus and method outputs an accurate matching position even if a search image contains a pattern similar to a template. An image search unit includes a relative position comparing unit which compares the relative position of a template in a template selection image with the relative position of a location currently being searched for in a search image and outputs the amount of position mismatch between the relative positions. A matching position determining unit determines a matching position by taking into consideration the amount of position mismatch in addition to search image similarity distribution information.

10 Claims, 18 Drawing Sheets

Image without integration

Image generated
by integration of 4 images

Image generated
by integration of 16 images

A  Search image

B  Template

C  Correct matching position

D  Other matching positions

E  Other matching positions

F  Normalized correlation map

A  Template selection image region

B  Search image region

C  Normalized correlation map region of template selection image

D  Normalized correlation map region of search image

E  Region for calculating similarity between normalized correlation maps (a) Object (a') Object (b) Template Selection Image (c) Template    (b') Search image (d) Neighboring region similarity distribution information (d') Search image similarity distribution information

IMAGE PROCESSING METHOD FOR DETERMINING MATCHING POSITION BETWEEN TEMPLATE AND SEARCH IMAGE

BACKGROUND OF THE INVENTION

1. Field of the Invention

The present invention relates to an inspection apparatus and an inspection method and, in particular, to an inspection using template matching in an inspection apparatus such as a semiconductor inspection apparatus, for example.

2. Background Art

A technique for searching through an image for a given shape (template) has been widely used as template matching (see Section 8.3 of Digital Picture Processing by Azriel Rosenfeld and Avinash C. Kak).

Attempts to speed up template matching have been made such as a technique disclosed in JP Patent Publication (Kokai) No. 2003-85565 in which the degrees of similarity of x-projection and y-projection in a search image to a template are integrated to quickly obtain a matching position. Also, attempts to improve the accuracy of template matching have been made such as a technique disclosed in JP Patent Publication (Kokai) No. 61-98483 in which distribution of local similarities in a search image to a template is taken into consideration to accurately estimate the degree of similarity even in an image that contains much noise.

Template matching is also performed in measurement of a pattern on a semiconductor wafer using a scanning electron microscope to determine measurement positions. Rough alignment of measurement positions is performed by moving the stage on which the wafer is loaded. However, with the positioning precision of the stage, a significant misregistration occurs in an image taken with an electron microscope with a high magnification. To correct the misregistration to perform measurement at an accurate position, template matching is performed. In particular, a unique pattern approximate to the measurement position is registered as a template and the relative coordinates of the measurement position with respect to the template are stored. To obtain the measurement position in an image taken, template matching is performed in the taken image to determine a matching position. The measurement position is at the relative coordinates from the matching position.

FIG. 1 illustrates template matching under a scanning electron microscope. First, the measurement position of an object (a) is photographed and a unique pattern in the position is registered as a template. The image (b) taken is referred to as a template selection image and the unique pattern (c) selected from the template selection image is referred to as a template. When an image of another object (a') is taken (object (a') may be another location that has the same pattern as (a) on the same wafer as (a), for example the same part of one of multiple identical dies formed on the same wafer, or may be a location having the same pattern on another wafer), the taken image is searched for a pattern that matches the template. The taken image (b') is referred to as a search image. There is a misalignment between the template selection image (b) and the search image (b') that is equal to the registration error of the stage. The misalignment is corrected by template matching. As a result of the template matching, portions with a high degree of similarity to the template are identified as candidate matching positions. The best position as the matching position is selected from among the candidate, matching positions as the ultimate matching position. For example, if the method described in JP Patent Publication (Kokai) No. 61-98483 is used, the template is subdivided into sections, the distribution of local similarities to the sections of the template is calculated for each candidate matching position and the ultimate matching position is determined by taking into consideration the distributions.

FIG. 2 shows a flow of template matching under a scanning electron microscope described above. A template selection image taken is input in a template registration unit for registering templates, a unique pattern selected manually or automatically is extracted in the template extracting unit and is stored. A search image taken is input in an image search unit which searches a matching position with the template, and is then compared with the template in a search image similarity calculating unit. The search image similarity calculating unit outputs search image similarity distribution information representing how the similarities to the template are distributed over the search image. A matching position determining unit determines a matching position based on the search image similarity distribution information.

Here, the point with the highest degree of similarity may simply be selected as the matching point or the method described in JP Patent Publication (Kokai) No. 61-98483 may be used. If the method is used, the search image similarity distribution information includes information about local similarities obtained using the subdivided template. If the distributions of similarities between the template and an x-projection and y-projection of the search image is held as search image similarity distribution information as described in JP Patent Publication (Kokai) No. 2003-85565, a matching position can be quickly determined.

As has been described above, the existing template matching methods attempt to accurately estimate the degrees of similarity in a search image to a template for example by taking into consideration the distribution of local similarities even if the image contains much noise.

SUMMARY OF THE INVENTION

However, according to the methods described above, the matching position in an image including a periodic pattern is not stabilized because the image contains multiple instances of the pattern that match a template.

FIGS. 3 and 4 show images of series of contact holes, namely hole arrays, formed on semiconductor wafers. In either case, an area around a hole to be measured in a template selection image is used as a template in order to identify the hole to be measured in a search image. In FIG. 3, the area around the hole to be measured is unique in the whole image and therefore the hole to be measured can be; identified by the existing methods. In FIG. 4, the holes are regularly and periodically repeated and therefore the pattern that matches the template is not unique but multiple instances of the pattern exist. In this case, the hole to be measured cannot be identified by the existing methods. In such a case, it may make no difference which of the holds is measured. However, there are demands to identify and measure a hole in a search image at the same position as a hole specified in a template selection image if the difference between the field of view of the search image and the field of view of the template selection image is small. The demands can possibly be met by an existing method by limiting the range of search to enable the hole at the same position to be identified if a condition is given that the difference between the field of view of the search image and that of the template selection image is small. However, in some cases, the condition that the difference between the field of view of a template selection image and that of a search image is small cannot be used because this adds operator's labor and because there is a risk that the condition could be mistakenly set and unsuccessful observation could result.

The present invention has been made in these circumstances and provides an inspection apparatus and method that output an accurate matching position even in a search image including a periodic pattern.

To solve the problem described above, according to the present invention, the relative position of a location currently being searched for in a search image is compared with the relative position of a template in a template selection image, the amount of mismatch between the relative positions is output, and a matching position is determined by taking into consideration the amount of mismatch as well as search image similarity distribution information.

An inspection apparatus according to the present invention is an inspection apparatus which obtains a search image and applies template matching to the search image, including: a storage unit storing a relative position of a template in a template selection image; a similarity distribution calculating unit calculating a distribution of similarities in a search image to a template during template matching; a position mismatch amount calculating unit (relative position comparing unit) obtaining a relative position of the template from the storage unit and calculating an amount of mismatch between a relative position of a searched location in the search image and a relative position of a template in the template selection image; and a matching position determining unit determining a matching position on the basis of a distribution of similarities in the search image to the template and the amount of mismatch.

The matching position determining unit changes the ratio of the amount of mismatch reflected in determining the matching position in accordance with the degree of periodicity of the search image.

The storage unit further stores a distribution of similarities to a template in the template selection image. In this case, the matching position determining unit may determine the matching position by taking into consideration the similarity between a distribution of similarities in the search image to a template and a distribution of similarities in the template selection image to the template during the template matching.

The position mismatch amount calculating unit may calculate 1.0 minus the ratio of the area of a region for calculating the degree of similarity between normalized correlation maps to the area of the normalized correlation maps as the amount of mismatch. The position mismatch amount calculating unit may calculate the sum of an amount of mismatch in the x-direction and an amount of mismatch in the y-direction as the amount of mismatch or may output the amount of mismatch in the x-direction or the amount of mismatch in the y-direction, whichever is greater, as the amount of mismatch.

The inspection apparatus according to the present invention further includes a user interface for setting a ratio of influence of the amount of mismatch on determination of an ultimate matching position so that a user can set the ratio as appropriate.

The present invention also provides an inspection method equivalent to the inspection method described above.

Other features of the present invention will be apparent from the detailed description of preferred embodiments below and the accompanying drawings.

According to the present invention, an accurate matching point can be output without having to specifying a condition that a mismatch between the field of view of a template selection image and that of a search image is small even when the search image includes a periodic pattern.

DESCRIPTION OF SYMBOLS

Figure 1:
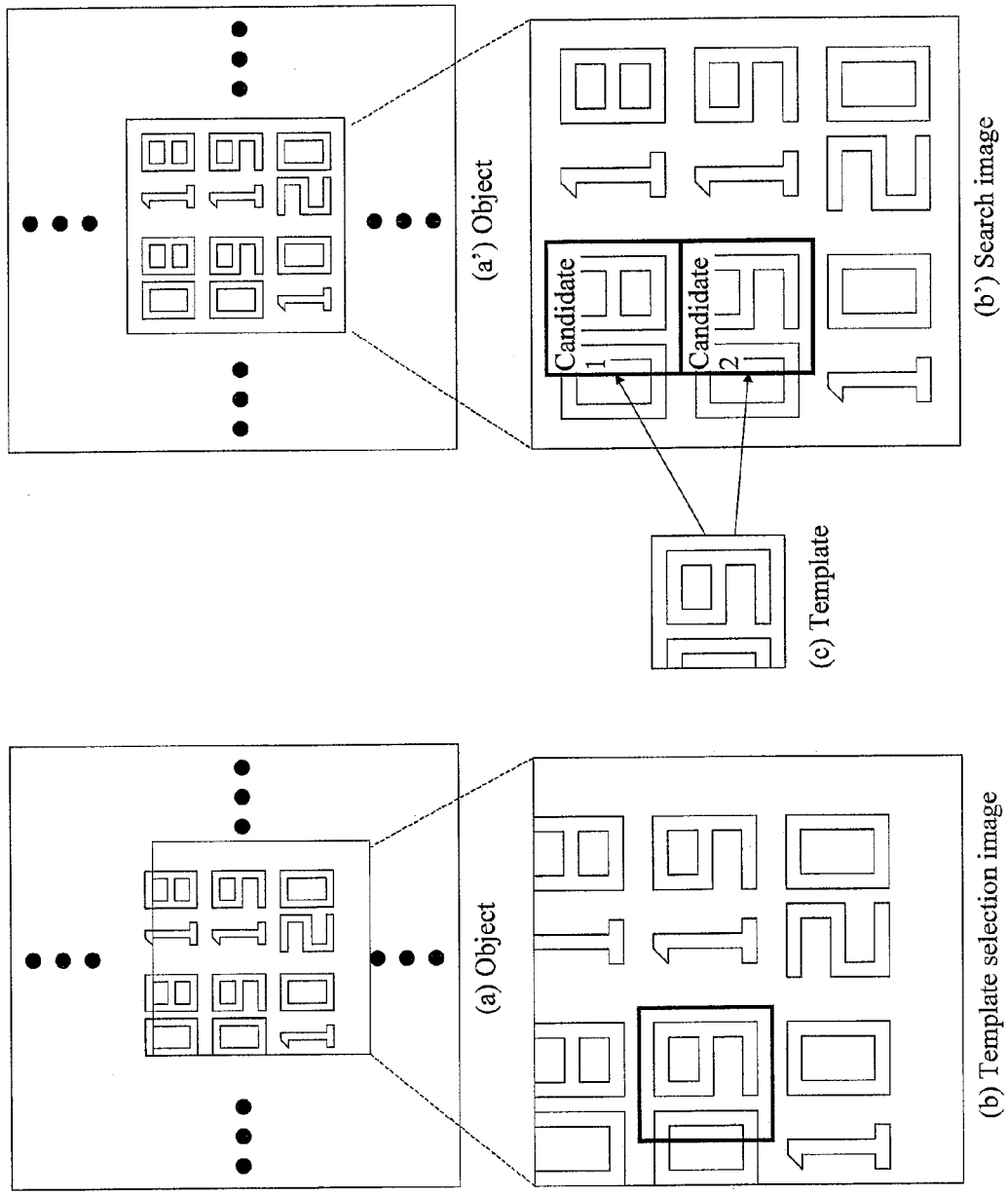
FIG. 1 shows a concept of a known art.
Figure 2:
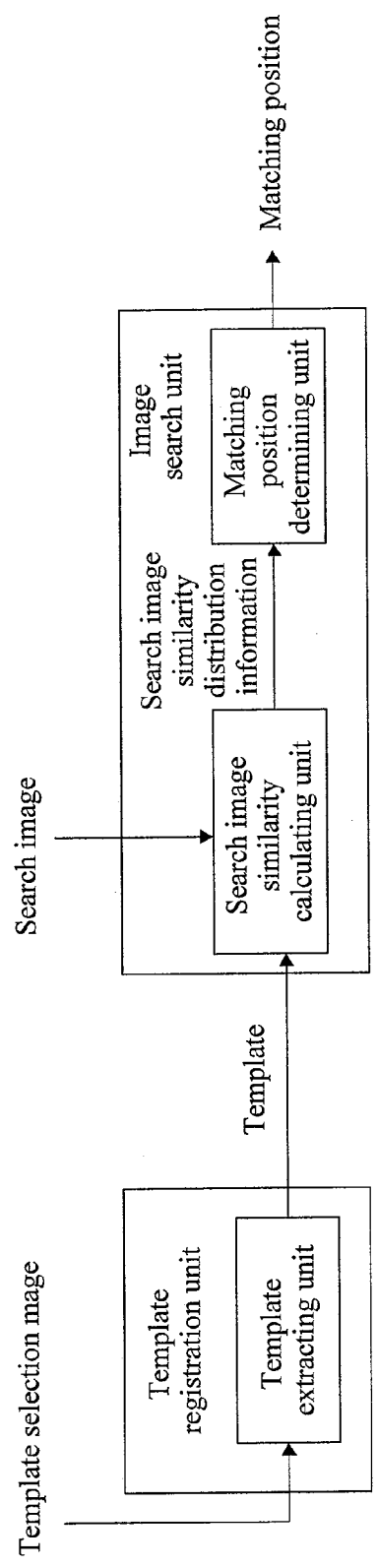
FIG. 2 is a block diagram schematically showing a configuration of an inspection apparatus according to the known art.

51, 61 . . . Template registration unit.
52, 62 . . . Image search unit
511, 611 . . . Template extracting unit
521, 621 . . . Search image similarity calculating unit
522, 622 . . . Relative position comparing unit
523, 623 . . . Matching position determining unit
624 . . . Similarity distribution similarity calculating unit

DETAILED DESCRIPTION OF THE PREFERRED EMBODIMENTS

Embodiments of the present invention will be described with reference to the accompanying drawings. However, it should be noted that the embodiments are illustrative only and not limitative of the present invention.

Configuration of Inspection Apparatus

Figure 5:
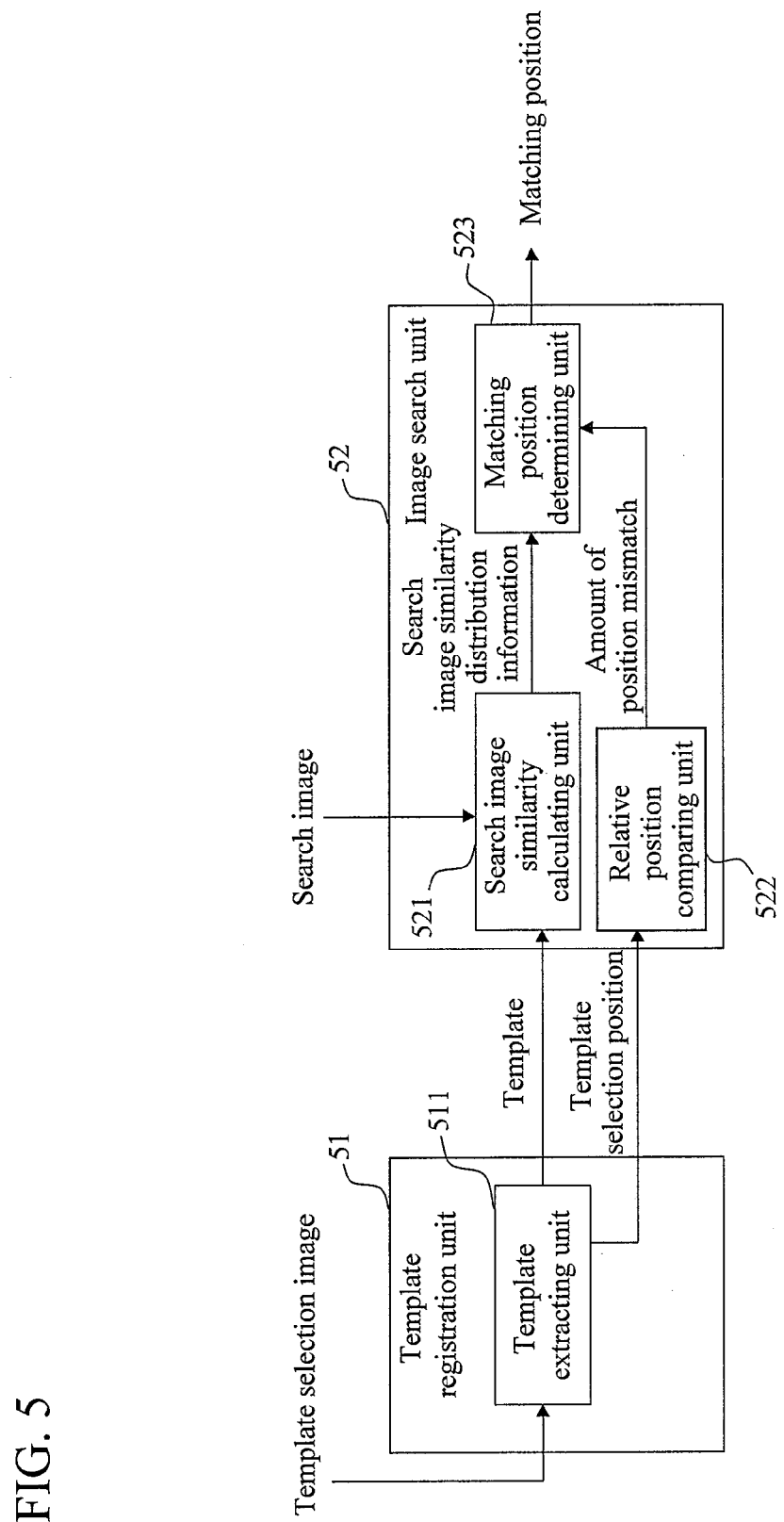
FIG. 5 is a block diagram schematically showing a configuration of an inspection apparatus according to one embodiment of the present invention.

FIG. 5 is a block diagram schematically showing a configuration of an inspection apparatus according to an embodiment of the present invention. In FIG. 5, an image taken with a camera or electron microscope or such an image stored is input in a template registration unit 51 as a template selection image. A template extracting unit 511 extracts a template from the template selection image input in the template registration unit 51. The template is stored in the template registration unit 51 until template matching with a search image is performed.

When an image taken with a camera or an electron microscope or such an image stored is input in an image search unit 52 as a search image, a search image similarity calculating unit 521 outputs a distribution of similarities in the search image to the template as search image similarity distribution information. A relative position comparing unit 522 compares the relative position of the template in the template selection image with the relative position of a search point (a region whose similarity to the template is to be determined) in the search image and outputs the amount of mismatch between them. A matching position determining unit 523 determines a matching position on the basis of the search image similarity distribution information and the amount of mismatch.

Figure 6:
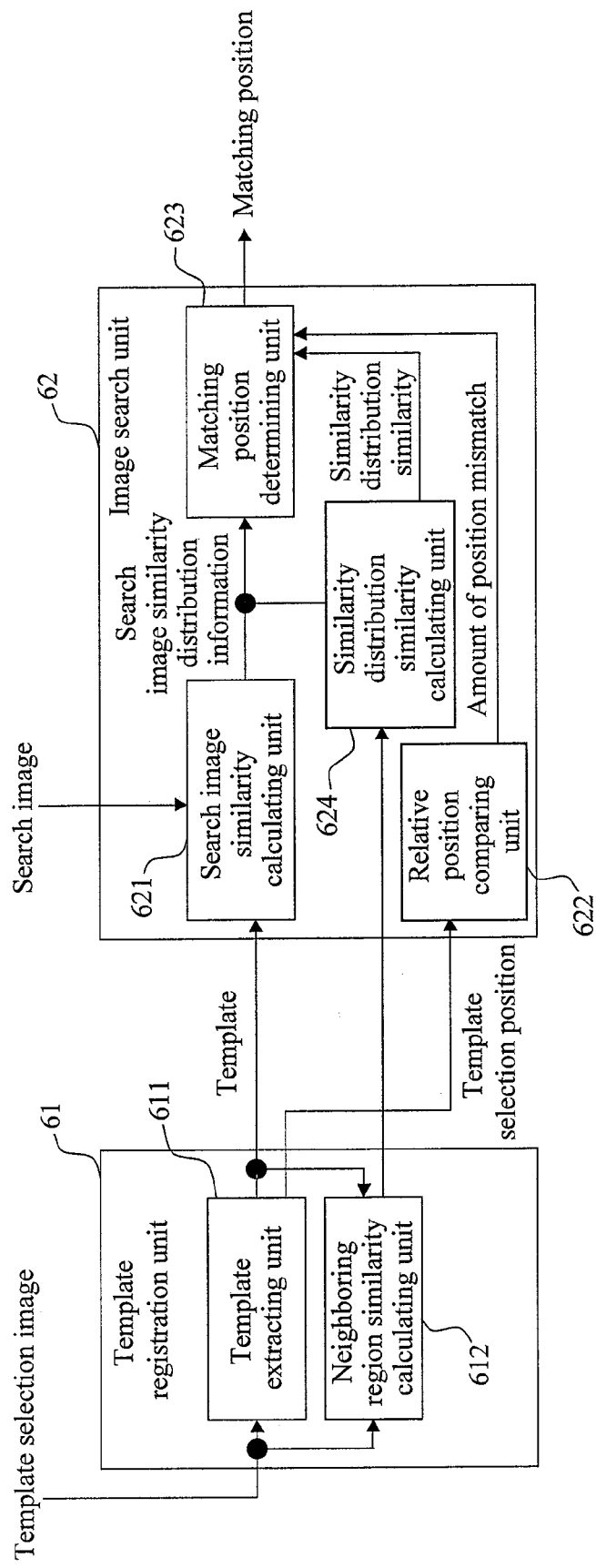
FIG. 6 is a block diagram schematically showing a configuration of an inspection apparatus according to another embodiment of the present invention.

FIG. 6 is a block diagram schematically showing a configuration of an inspection apparatus according to another embodiment of the present invention. In FIG. 6, as with the apparatus shown in FIG. 5, an image taken with a camera or electron microscope or such an image stored is input in a template registration unit 61 as a template selection image. A template extracting unit 611 extracts a template from the template selection image input in the template registration unit 61. A neighboring region similarity calculating unit 612 outputs a distribution of similarities in the template selection image to the template as neighboring region similarity distribution information. The template and the neighboring region similarity distribution information are stored in the template registration unit until template matching with a search image is performed.

When an image taken with a camera or electron microscope or such an image stored is input in an image search unit 62 as a search image, a search image similarity calculating unit 621 outputs a distribution of similarities in the search image to the template as search image similarity distribution information. A similarity distribution similarity calculating unit 624 outputs the degree of similarity between neighboring region similarity distribution information and search image similarity distribution information as similarity distribution similarity. A relative position comparing unit 622 compares the relative position of the template in the template selection image with the relative position of a search point (a region whose similarity to the template is to be determined) in the search image and outputs the amount of mismatch between them. A matching position determining unit 623 determines a matching position from the search image similarity distribution information and the similarity distribution similarity.

Figure 3:
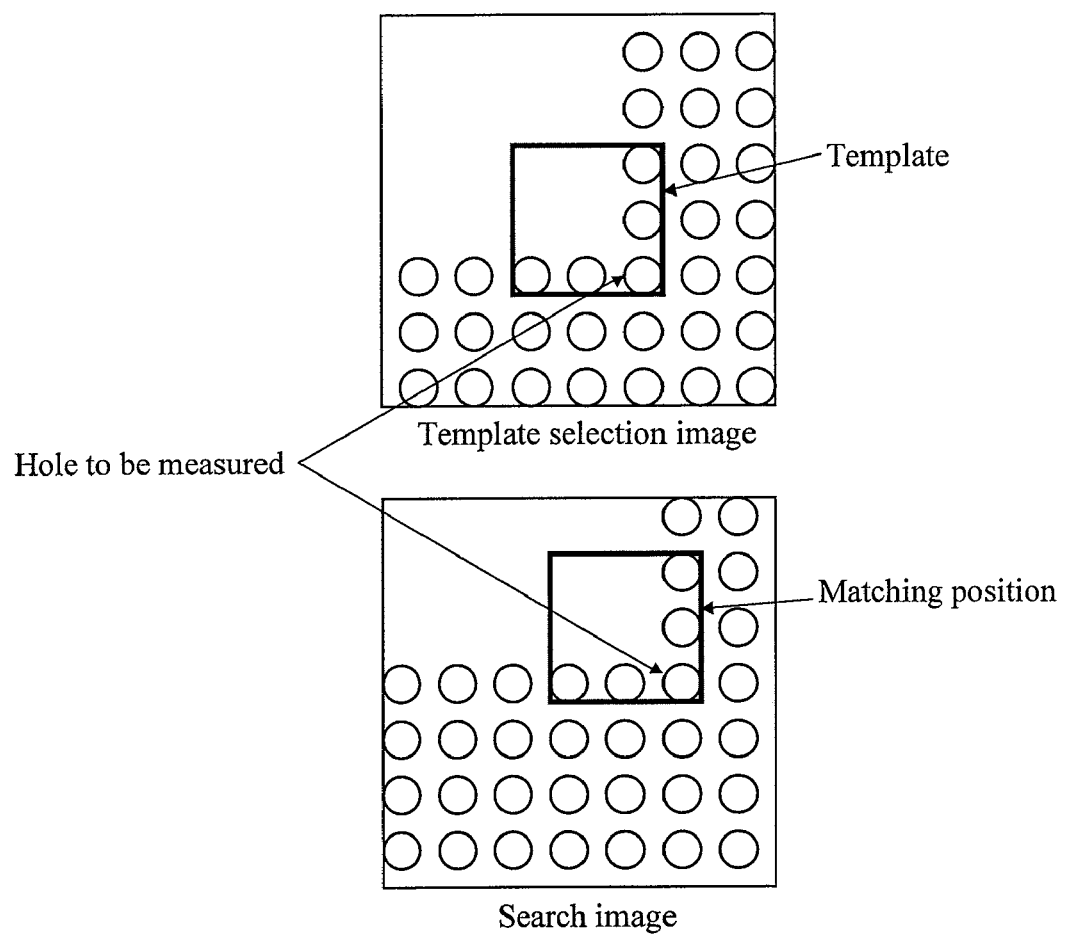
FIG. 3 shows exemplary images of a hole array without periodicity.
Figure 4:
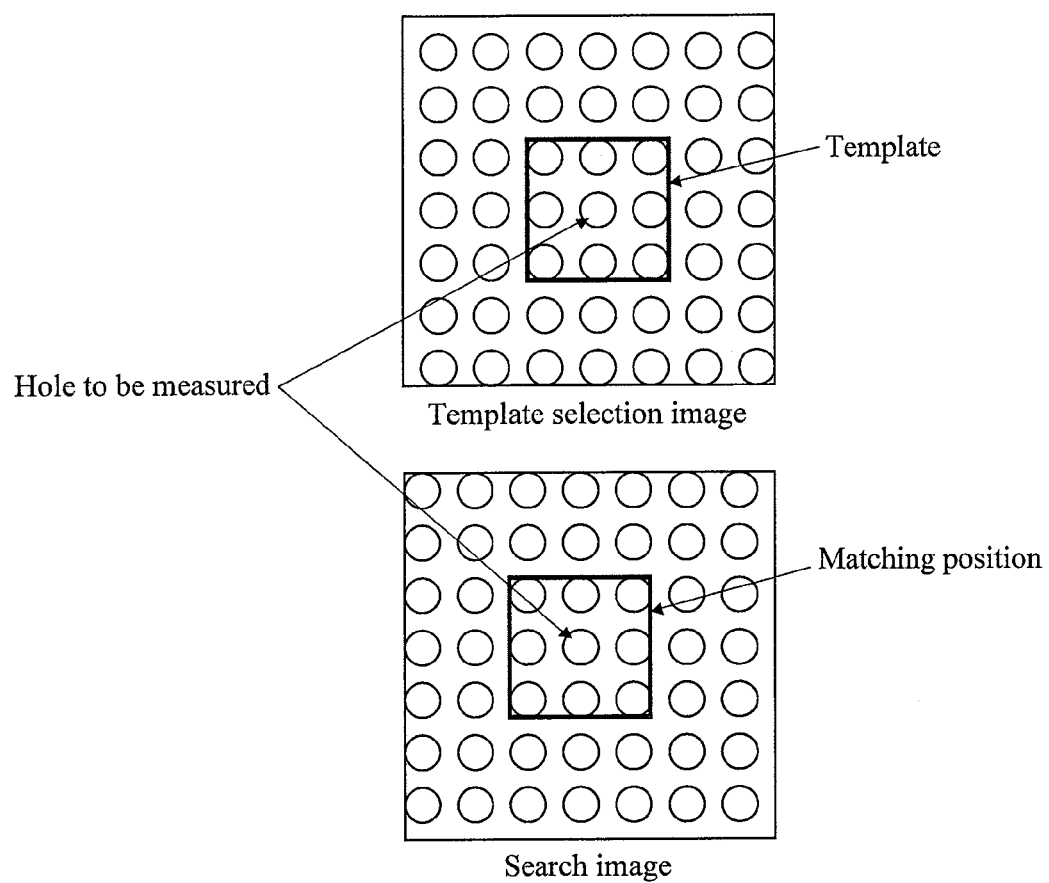
FIG. 4 shows exemplary images of a hole array with periodicity.

Specific Processing in Inspection Apparatus (in FIGS. 3 and 6)

Figure 7:
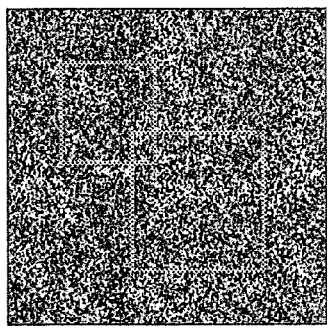
FIG. 7 shows examples of images input from a scanning electron microscope generated by different number of integrations.
Figure 7:
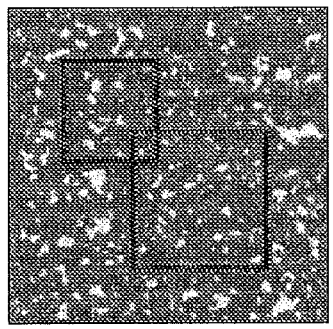
Figure 7:
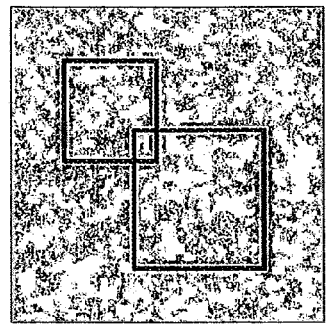

FIG. 7 shows scanning electron microscopy images input as template selection and search images. Scanning electron microscopy images contain much noise and it is difficult to recognize a pattern directly from the images because they are buried in noise. Therefore, the same image is retaken a number of times and the images are integrated. Pattern information in the retaken images is the same whereas noise randomly varies in every retake. Therefore the integration reduces the noise, showing the patterns clearly.

Template matching will be described with reference to FIG. 8. FIG. 8A shows a search image and FIG. 8B shows a template (reference image). Here, template matching is a process for detecting a portion of a search image that matches a template. Examples of template matching include a process in which a template is moved over each place in a search image while calculating normalized correlation values. A place at which the highest correlation value is obtained is judged to be a place that has the same pattern as the template.

A CD-SEM is an inspection apparatus that uses a scanning electron microscope to measure certain parts on a semiconductor wafer. When the first wafer is measured with the CD-SEM, a portion having a unique pattern near a portion to be measured is registered as a template in order to identify the portion on a wafer to be measured. When the same location on the subsequent wafers is to be measured, the coordinates of the location obtained by template matching are used to identify the portion to be measured.

Figure 8:
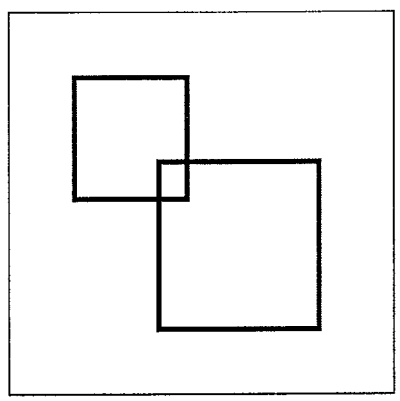
FIG. 8 shows a concept of template matching.
Figure 8:
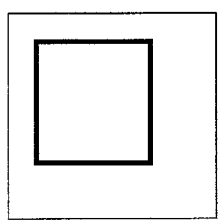
Figure 8:
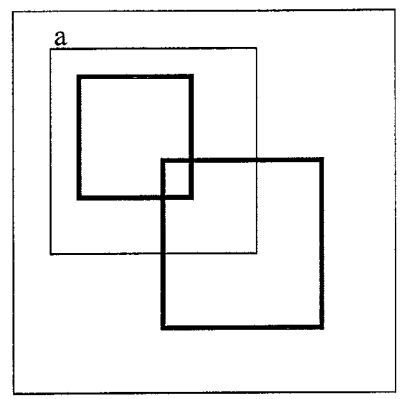
Figure 8:
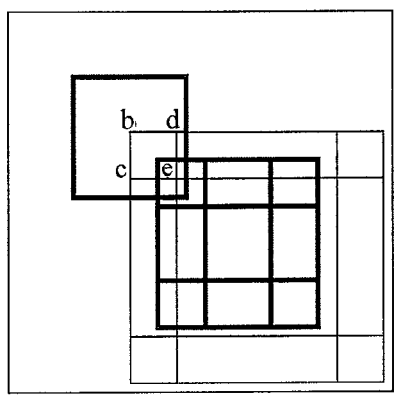
Figure 8:
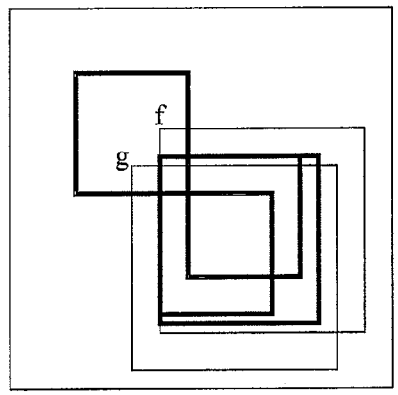
Figure 8:
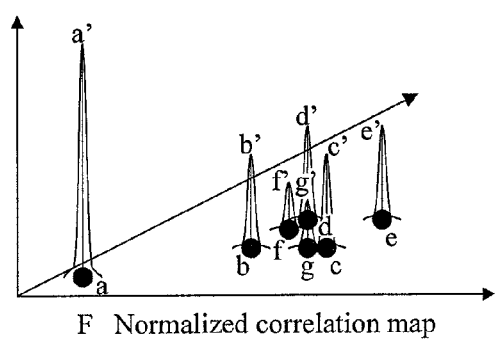

In the example in FIG. 8, the search image has the same pattern as the template at location "a" (FIG. 8C). Although not the same pattern, the locations with the second highest correlation value are locations b, c, d, and e (FIG. 8D). The locations with the third highest correlation value are locations f and g (FIG. 8E). The other locations have little correlation and the correlation values are close to 0. FIG. 8F shows an image, called normalized correlation map, in which the pixel values are the correlation values at the coordinates of the pixels. Location a has the value a' that is close to 1. Locations b, c, d, e, f, and g have the values b', c', d', e', f', and g' that are lower than a'. The normalized correlation map is one example of similarity distribution information. When template matching is performed, desirably filters such as a noise reduction filter and edge enhancement filter are applied to the input image before calculating normalized correlation values.

Figure 9:
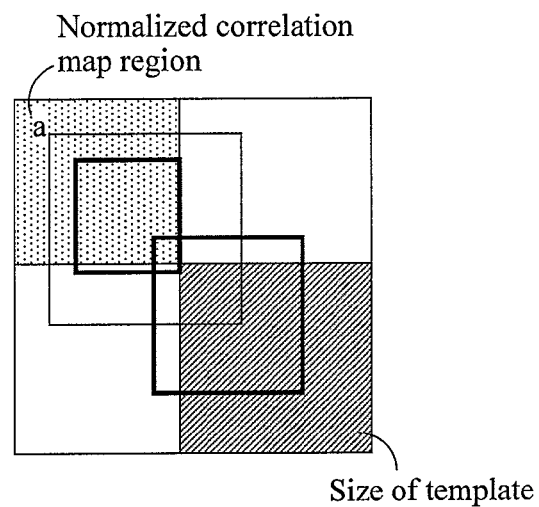
FIG. 9 is a diagram for explaining a normalized correlation map region.

FIG. 9 shows an example of the dimensions of a normalized correlation map region. If the values at each point in a normalized correlation map is defined as the value of correlation with a template when the upper left corner of the template is aligned with the point, the lower right corner of the normalized correlation map coincides with the upper left corner of the template when the template is aligned with the lower right corner. Accordingly, the vertical length of the normalized correlation map region is equal to the vertical length of the search image minus the vertical length of the template; the horizontal length of the normalized correlation map region is equal to the horizontal length of the search image minus the horizontal length of the template.

Figure 10:
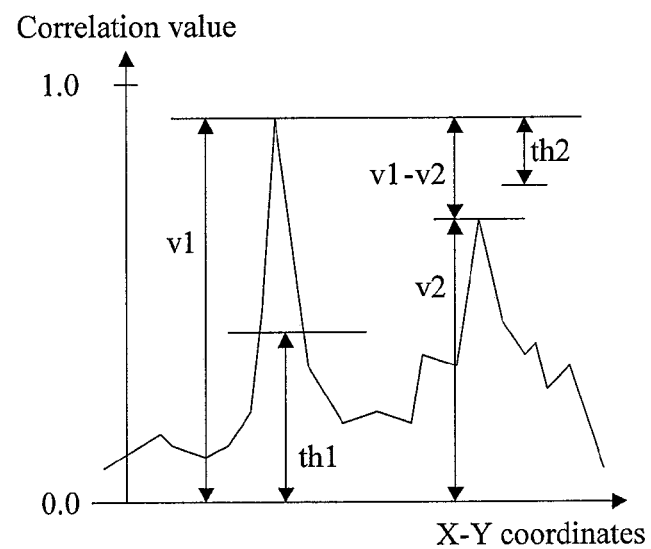
FIG. 10 shows a method for determining a matching position.

FIG. 10 illustrates how a matching position is determined from the normalized correlation map (FIG. 8F). The horizontal axis represents x-y coordinates and the vertical axis represents correlation values. The peak of the correlation value represents the position that best matches the template. If the largest correlation value v1 is smaller than a predetermined threshold value th1, it is appropriate to consider that there is no position that matches the template. If the difference between the second largest correlation value v2 and v1, v1−v2, is smaller than a predetermined threshold value th2, the matching position may be determined by the degree of similarity between similarity distributions (the degree of similarity between normalized correlation maps), rather than the magnitude of correlation values. Alternatively, predetermined weights may be assigned to the correlation values and the degree of similarity between similarity distributions and the matching position is determined by the magnitude of the sum. Alternatively, the amount of position mismatch may be taken into consideration and a matching point with a less amount of position mismatch may be considered as a better matching point and chosen as the matching point.

Figure 11:
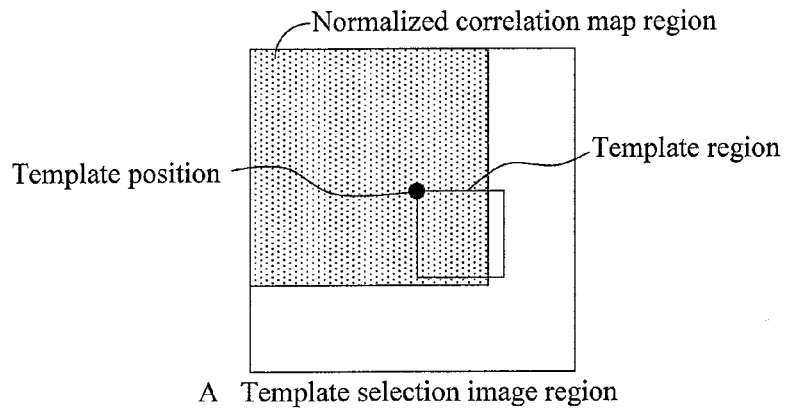
FIG. 11 is a diagram for explaining a region for calculating the degree of similarity between normalized correlation maps.
Figure 11:
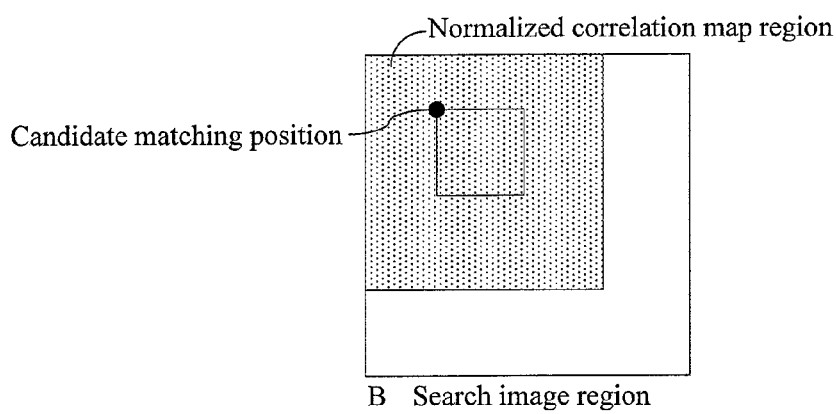
Figure 11:
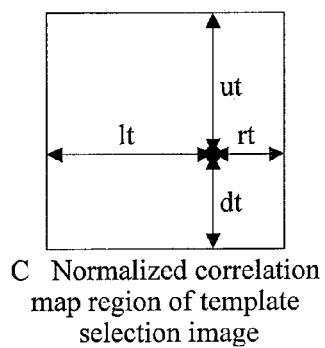
Figure 11:
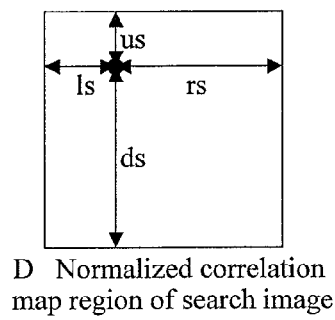
Figure 11:
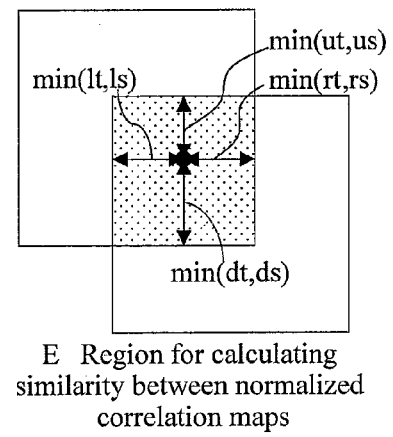

FIG. 11 illustrates the sizes of regions that can be used for calculating the degree of similarity between similarity distributions when normalized correlation maps are used as similarity distributions, that is, the degree of similarities between normalized correlation maps. The normalized correlation map regions of a template selection image and a search image are the shaded areas in FIGS. 11A and 11B, respectively, which are the image areas excluding the template areas as described with respect to FIG. 9. If the template is at a distance of lt from the left side of the normalized correlation map region of the template selection image, rt from the right side, ut from the top, and dt from the bottom (see FIG. 11C) and at a distance of ls from the left side of the normalized correlation map region of the search image, rs from the right side, us from the top, and ds from the bottom (see FIG. 11D), the region for calculating the degree of similarity between the normalized correlation maps is a region that has a horizontal length of min (lt, ls)+min (rt, rs) and a vertical length of min (ut, us)+min (dt, ds) (see FIG. 11E). The area of the region decreases as the amount of position mismatch between the template position and the candidate matching position increases. If the region for calculating the degree of similarity between normalized correlation maps is too small, the degree of similarity between the normalized correlation maps becomes meaningless. If this is the case, the magnification needs to be decreased to retake the image of a wider area.

If the amount of position mismatch which is defined as 1.0 minus the ratio of the area of the region for calculating the degree of similarity between the correlation maps to the area of the normalized correlation maps is too large, the degree of similarity between the correlation maps does not have much meaning. Therefore, as the amount of position mismatch increases, the influence of the degree of similarity between normalized correlation maps on determination of the matching position may be reduced.

Referring to FIGS. 12 to 16, a method for identifying and measuring a hole at the same position specified in a template selection image will be described with respect to a case where a pattern is not unique but multiple instances of the pattern exist because holes are regularly and periodically repeated.

FIGS. 12 to 16 show an example in which template matching is performed in two steps with different magnifications to identify a hole to be measured. In the two-step matching, the first matching with a low-magnification image will be referred to as addressing and the second matching with a high-magnification image will be referred to as alignment.

Figure 12:
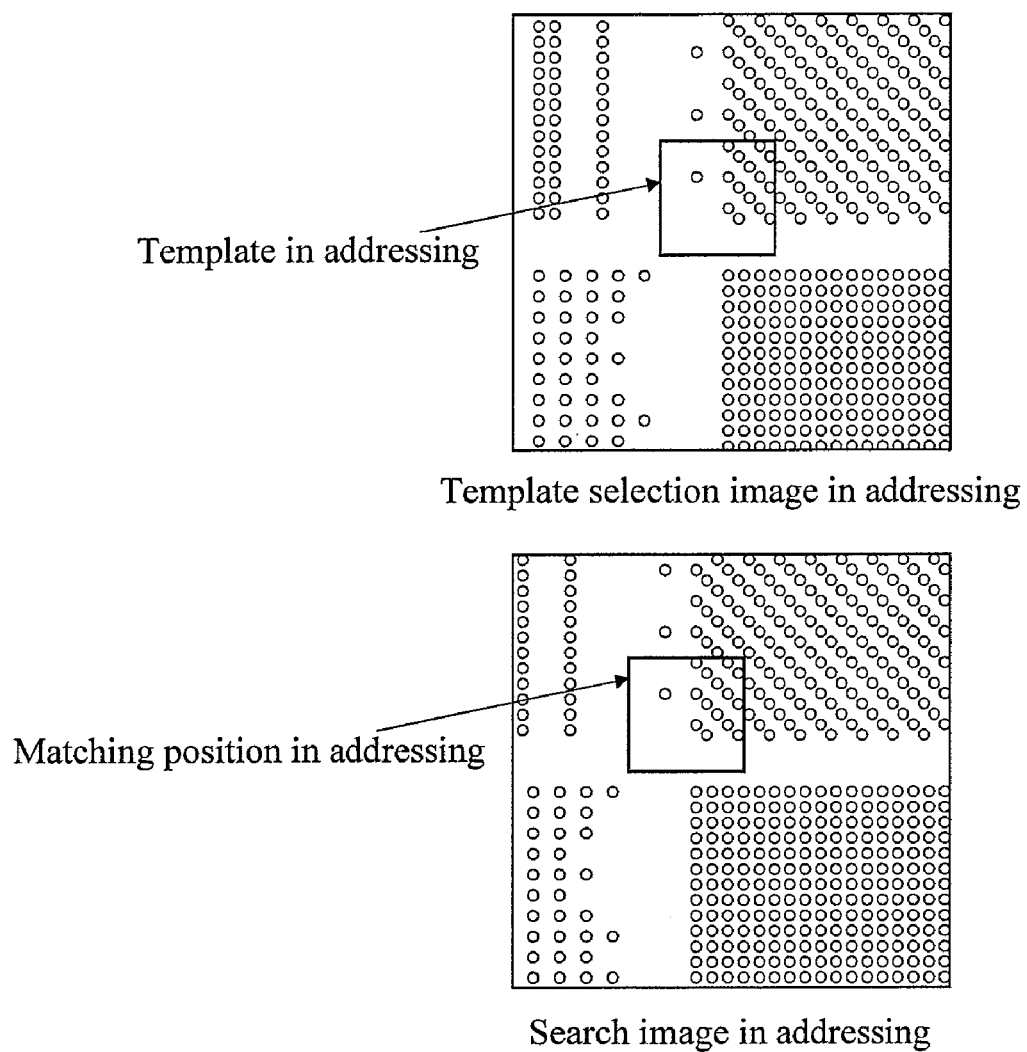
FIG. 12 is a diagram for explaining matching in addressing.

FIG. 12 shows addressing. In the addressing, an image with a wide field of view taken with a low magnification is used. It is easier to find a unique pattern in an image with a wide field of view. A unique template to be used in the addressing is selected from a template selection image for addressing and a search image is searched for a pattern that matches the template. Because the magnification is low, a stage movement error appears relatively small. Accordingly, the matching position in the search image is relatively close to a location where the template was selected.

Figure 13:
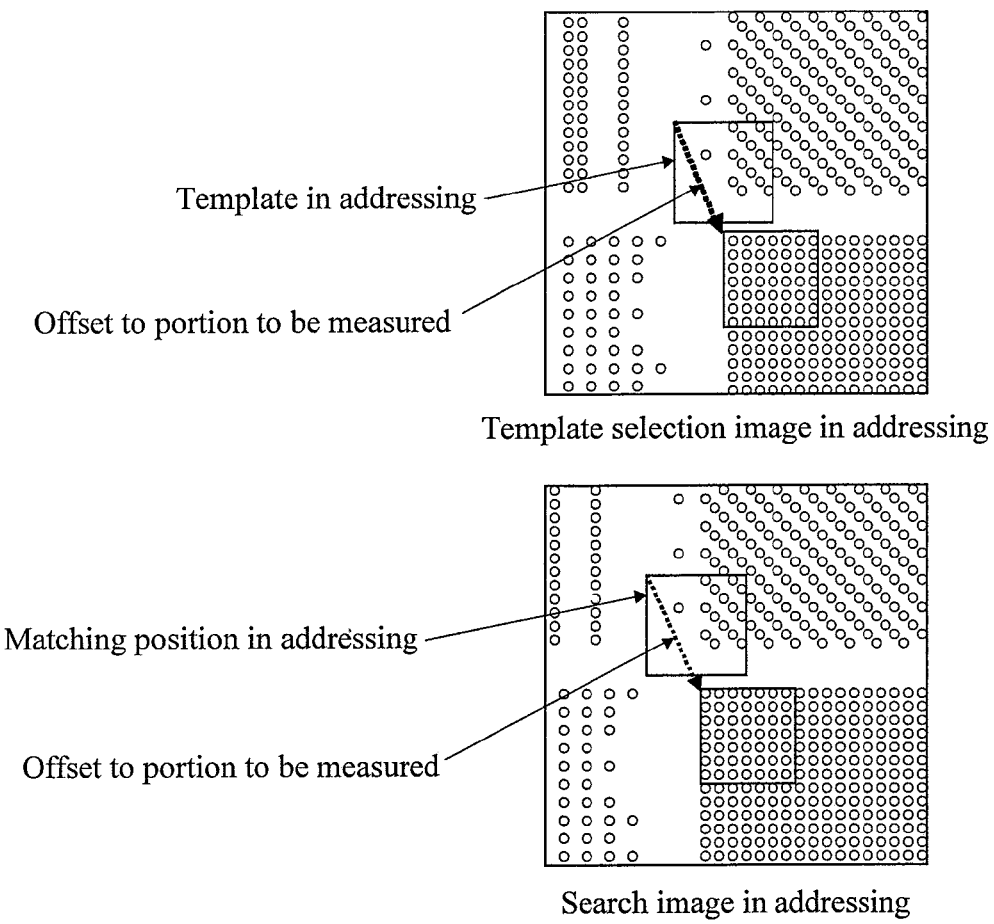
FIG. 13 is a diagram for explaining how a portion to be measured is identified in addressing.

FIG. 13 shows determination of the position at which an image to be acquired in the alignment is shot. Because the position in the template selection image for addressing at which the alignment image is to be shot is predetermined, the offset from the template selection position for the addressing to the position at which the alignment image is to be shot can also be determined beforehand. The position at a distance equal to the offset from the matching position in the search image in the addressing is the position at which the alignment image is to be taken.

Figure 14:
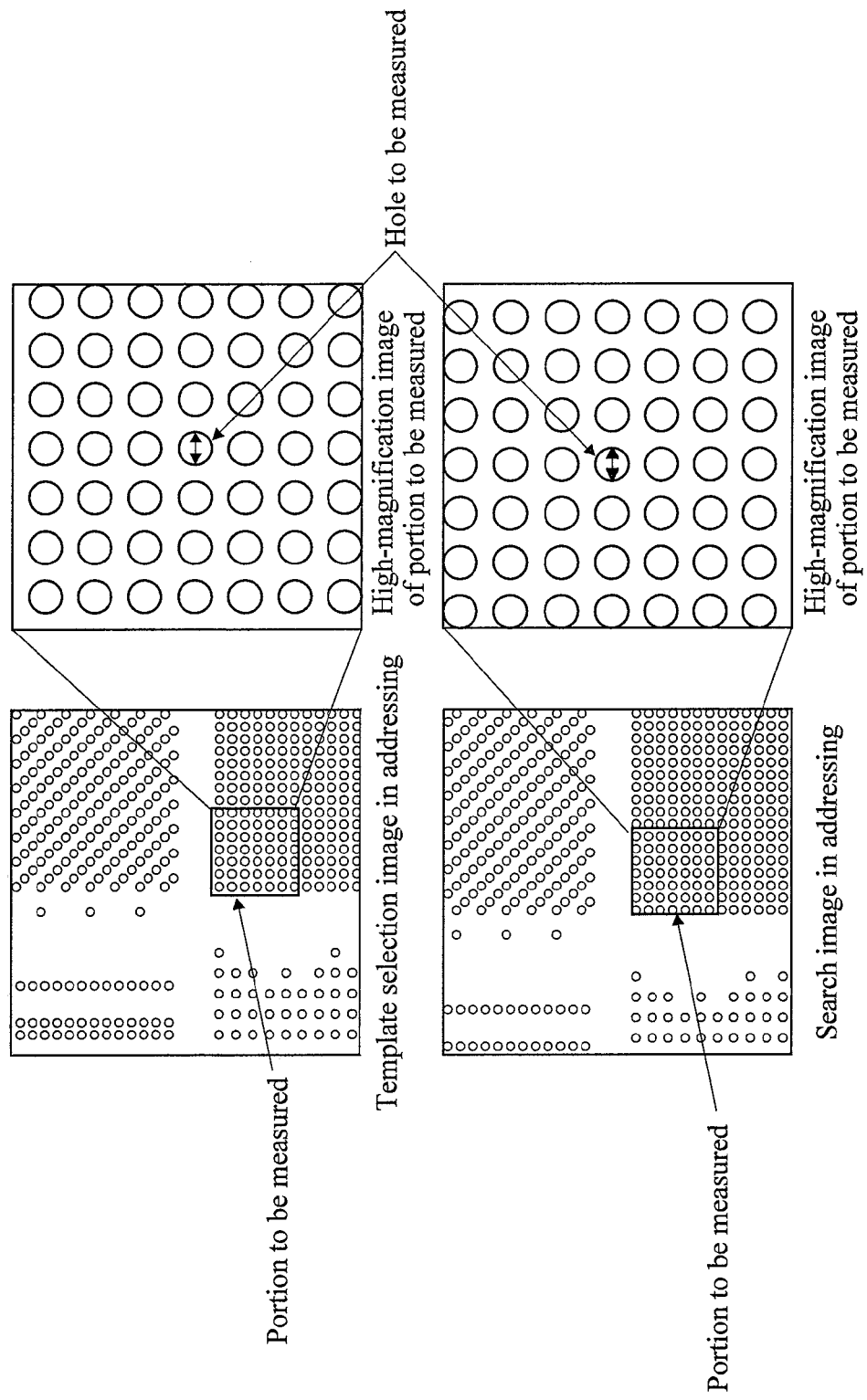
FIG. 14 is a diagram for explaining high-magnification photographing of a portion to be measured.

FIG. 14 shows a high-magnification image for alignment acquired at the position determined by the addressing. A mismatch between the field of view of the template selection image and that of the search image is small because the high-magnification image for alignment is taken by shifting the electron beam without moving the stage from the position at which the low-magnification image for addressing was taken. In particular, the position mismatch is caused by an addressing error and an error of shifting of the electron beam. The position mismatch is corrected again by aligning the hole to be measured before measurement such as measurement of the diameter of the hole.

Figure 15:
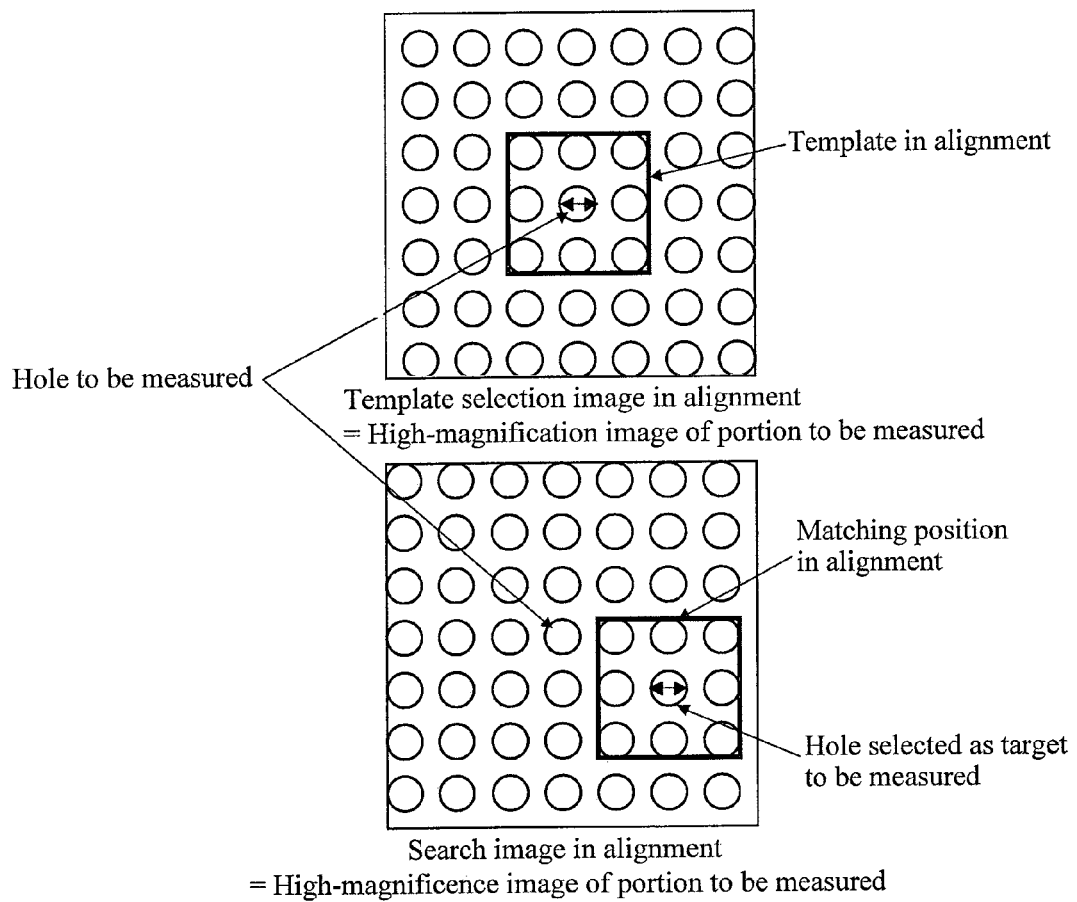
FIG. 15 is a diagram for explaining matching in alignment.

While a unique template can be selected in addressing, a unique template often cannot be selected in alignment if the hole to be measured is one of regularly spaced holes. FIG. 15 shows a case in which a unique template cannot be selected in alignment. If a template is not unique, the matching position in a search image may unstably take either the same pattern as the template or a pattern highly similar to the template and the result of matching is affected by a slight distortion or noise. In FIG. 15, a region around a hole to be measured has been set as a template. While a matching position should be in the region around the hole to be measured, a region around a hole different from the hole to be measured has been selected as the matching position because the pattern is periodic and template is not unique.

Figure 16:
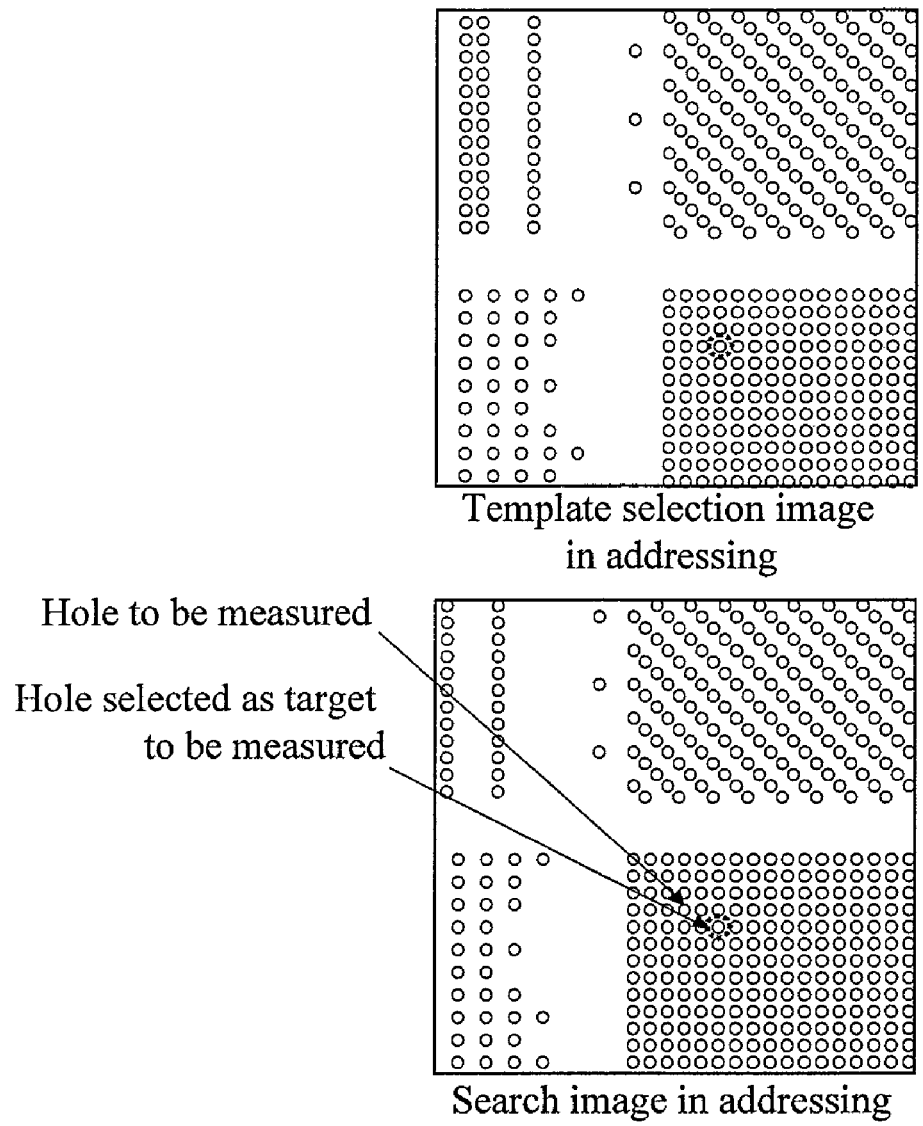
FIG. 16 shows an example of matching failure in alignment.

As a result, the hole actually selected as the target to be measured differs from the hole to be measured as shown in FIG. 16.

Figure 17:
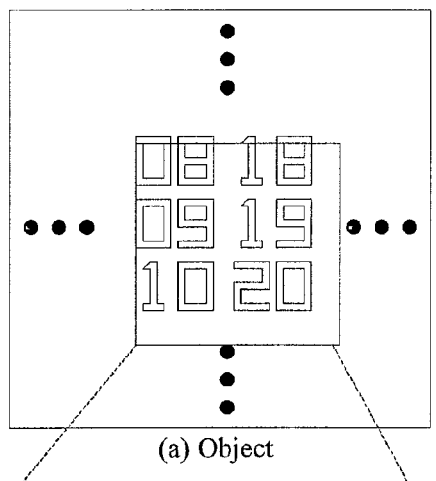
FIG. 17 shows an example of template matching using similarity distribution information.
Figure 17:
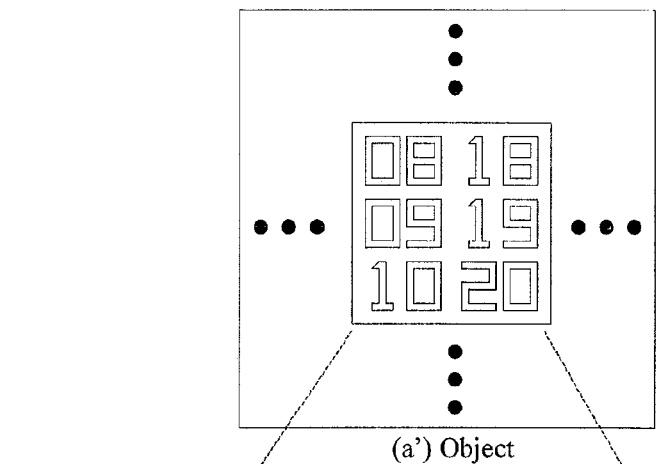
Figure 17:
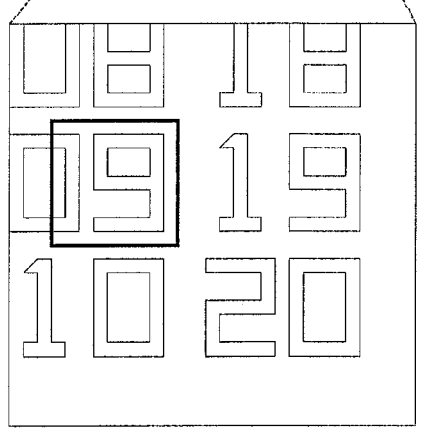
Figure 17:
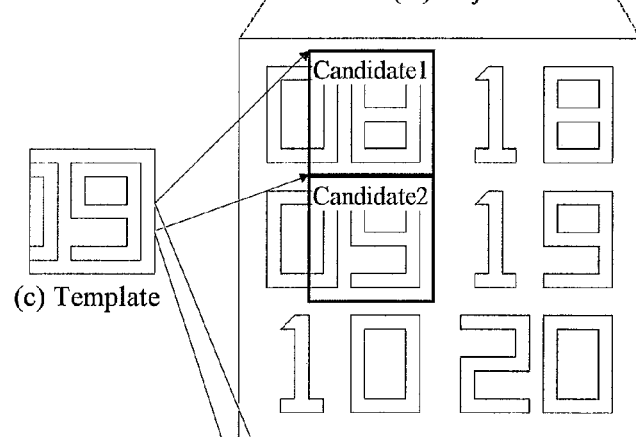
Figure 17:
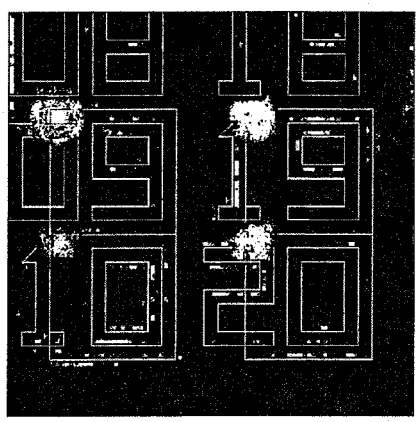
Figure 17:
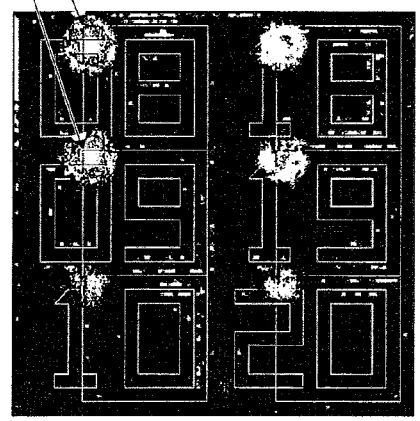

FIG. 17 shows an example of template matching using similarity distribution information. Parts (a), (a'), (b), and (b') of FIG. 17 show the same objects and search image as those in FIG. 1. When one of candidates 1 and 2 in FIG. 17 is to be selected as the matching position, candidate 2 can be properly identified as the matching position by using neighboring region similarity distribution information (d) and search image similarity distribution information (d') even if the degrees of similarity of candidates 1 and 2 are very close to each other or the degree of similarity of candidate 1 itself is higher. When the neighboring region similarity distribution information with the origin at the template position in the template selection image is superimposed on search image similarity distribution information with the origin at the position of candidate 2, it can be seen that the two pieces of similarity distribution information are very similar to each other. Both of them have the brightest portions around the origins and significantly darker portions to the right, below and lower right of the origins. The brightest portion in the search image similarity distribution information with the origin at the position of candidate 1 is below the origin, showing that the degree of similarity is low.

When the degree of similarity between two pieces of similarity distribution information is to be determined, the normalized correlation value at the template position in the template selection image should be excluded because the value is always 1. This is the adverse effect of the fact that the template position in the template selection image exactly matches the template (including noise). To avoid the adverse effect, two template selection images may be taken under the same conditions, a template may be extracted from one of the template selection image, and neighboring region similarity distribution information may be obtained with the other template selection image.

Normalized correlation map tend to take a value in a narrow range. Considering factors such as deformation of the pattern and rotation of images (images can slightly rotate under the influence of the Lorentz force), preferably a Gaussian filter or maximum filter is applied to the normalized correlation maps to increase the area of a bright portion, rather than directly using the normalized correlation maps, before the degree of similarity between the normalized correlation maps is determined. In order to speed up the process, it is also effective to reduce the resolution of the normalized correlation maps before determining the degree of similarity between the normalized correlation maps.

Furthermore, the similarity distribution information may be represented by a list of the coordinates of positions having high degrees of similarity and the degrees of similarity, instead of an image.

The pattern in the image in this example is not a periodic pattern. In the case of a periodic pattern, processing is effective that selects a candidate with a smaller amount of position mismatch as the matching position.

Figure 18:
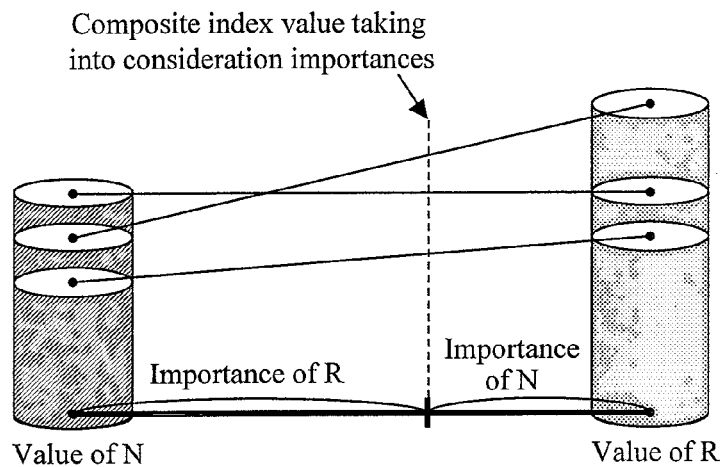
FIG. 18 is a diagram for explaining an index value taking into consideration the importances of N and R.
Figure 19:
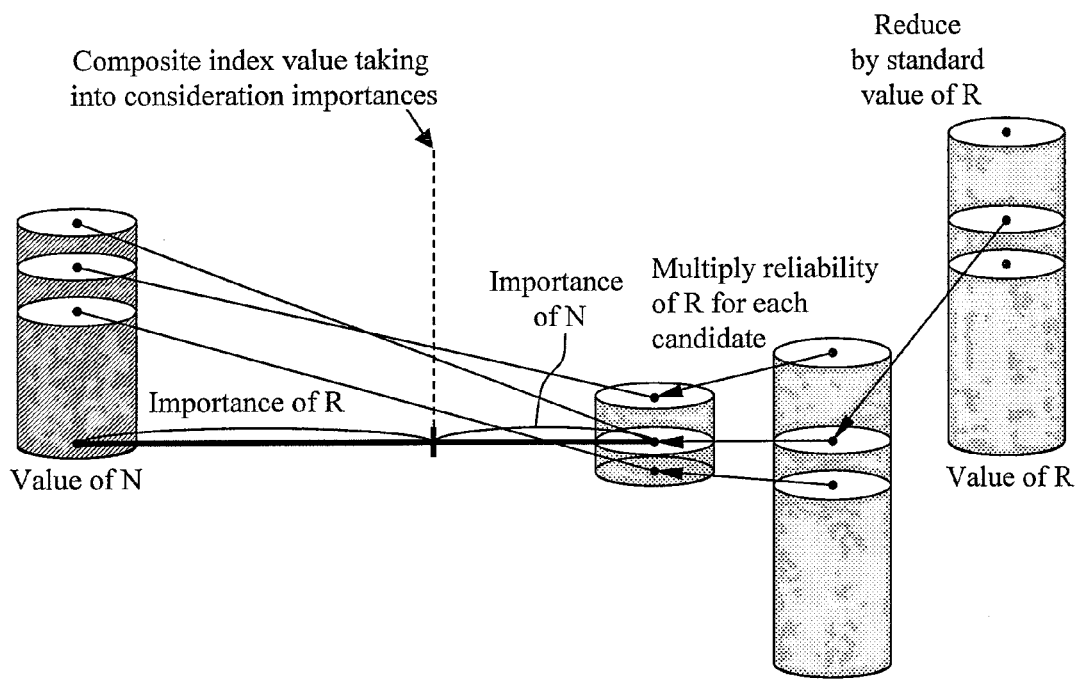
FIG. 19 is a diagram for explaining an index value taking into consideration the importances of N and R and the reliability of R.

FIGS. 18 and 19 show an example of composite index values, where the amount of position mismatch is 1.0 minus the ratio of the area of an region for calculating the degree of similarity between the normalized correlation maps shown in FIG. 11 (to the area of each normalized correlation map). Here, the composite index value is an index value to be compared in determination of the ultimate matching position, and includes the degree of similarity, the degree of similarity between similarity distributions, and the amount of position mismatch. The following symbols will be used in the description below.

N: Normalized correlation value (the degree of similarity)
R: Similarity between similarity distributions (the degree of similarity between (d) and (d') in FIG. 17)
A: Area ratio between overlapping regions (1.0—amount of position mismatch)
Here.

importance of N=Largest N among candidates (denoted by N') (1)

is introduced. The importance of N decreases as noise and pattern deformation increase.

Then, the importance of R is introduced. Examples of the importance of R include:

importance of R=highest R among candidates (denoted by R') (2), importance of R=highest (R times area ratio A of overlapping portions) among candidates (denoted by RA') (3), and importance of R=R that takes highest (R times A) among candidates (denoted by Ro) (4).

The importance of R decreases if a pattern is not formed or the field of view differs.

FIG. 18 shows a configuration of index values taking into consideration the importances of N and R. The index value for each of the three best candidates is obtained by taking into consideration of the importance, which is the average value of R and N weighted by the importances of R and N. Here, the importances of N and R are fixed for each image and common among the candidates. The difference between the scores of the candidates is constant even when a given value is added to or subtracted from the values of N and R of each candidate. Furthermore, reliability of R=area ratio between overlapping portions (A) (5)

is introduced. The reliability of R varies among the candidates and the influence of the magnitude of R on the ultimate composite index value should be reduced as the reliability of R decreases. Reducing the influence of the magnitude of R means that the value of R is approximated to the standard value of R, rather than reducing the value of R.

FIG. 19 shows a configuration of index values taking into consideration the importances of N and R and the reliability of R. The index value taking into consideration the importances of N and R and the reliability of R is calculated by taking into consideration the importances of N and R for each R reduced by the standard value of R. In effect, this is equivalent to approximating the value to the standard value of R according to the reliability of R because the reduction has no influence on the score difference as mentioned above.

The standard value of R is a neutral, typical value that is neither large nor small. In particular, examples of the standard value of R may include:

standard value of R=R that takes the highest (R times A) among the candidates (denoted by Ro) (6) and standard value of R=Ro times α (7)

where α is a real number less than 1.0, for example 0.9.

The smaller the standard value of R, the stronger the correlation between the ultimate index value of R and A (reliability of R) is. That is, a candidate in the search image at a relative position closer to the relative position of the template in the template selection image tends to be at a higher rank. This tendency is noticeable especially in a periodic image that has R with higher absolute value. That is, for the same α, the tendency is stronger in a highly periodic image and the ratio of the amount of position mismatch to be reflected in determination of the matching position varies according to the periodicity of the image.

In Equation (7), as the value of α decreases, the rank of a candidate with a smaller amount of position mismatch rises. This means that the effect of reducing the amount of position mismatch of the ultimate matching position can be controlled by α. The value of α may be fixed or may be set by an operator (to a variable value) through a user interface.

The amount of position mismatch is not limited to 1.0 minus the area ratio of the region for calculating the degree of similarity between normalized correlation maps (to the area of each normalized correlation map) described above. The amount of position mismatch may be any index that takes a greater value as the amount of position mismatch increases, such as the sum of the amount of position mismatch in the x-direction (the absolute value of the difference between relative positions in the x-direction) and the amount of position mismatch in the y-direction, or the amount of position mismatch in the x-direction or the amount of position mismatch in the y-direction, whichever is greater. The amount of position mismatch may be an index that requires a small amount of computation.

A case where normalized correlation maps are used as similarity distribution information has been described so far. Normalized correlation can be calculated as follows.

For images f $(n_1, n_2)$ and g $(n_1, n_2)$ of a size $N_1$ times $N_2$, $$E_f = \frac{1}{N_1 \times N_2} \sum_{n_1 n_2} f(n_1, n_2) \qquad \text{[Formula 1]}$$

is defined. Then, normalized correlation can be calculated as $$\frac{\sum_{n_1 n_2}(f(n_1,n_2)-E_f)(g(n_1,n_2)-E_g)}{\sqrt{\sum_{n_1 n_2}(f(n_1,n_2)-E_f)^2}\sqrt{\sum_{n_1 n_2}(g(n_1,n_2)-E_g)^2}} \quad \text{[Formula 2]}$$

$$\text{where } \begin{cases} 0 \le n_1 \le N_1 - 1 \\ 0 \le n_2 \le N_2 - 1 \\ \sum_{n_1 n_2} \text{represents} \sum_{n_1=0}^{N_1-1}\sum_{n_2=0}^{N_2-1}. \end{cases}$$

Here, $N_1$ times $N_2$ is the size of the template and f and g represent the template and the region of interest, respectively.

Similarity distribution information is not limited to normalized correlation maps. For example, phase-only correlation functions may be used. The phase-only correlation function will be described below.

For images f ($n_1$, $n_2$) and g ($n_1$, $n_2$) of a size of $N_1$ times $N_2$ (where $-N_1/2 \le n_1 \le N_1/2-1$ and $-N_2/2 \le n_2 \le N_2/2-1$), their discrete Fourier transforms F ($k_1$, $k_2$) and G ($k_1$, $k_2$) can be written as $$F(k_1,k_2) = \sum_{n_1 n_2} f(n_1,n_2) W_{N_1}^{k_1 n_1} W_{N_2}^{k_2 n_2} \quad \text{[Formula 3]}$$
$$= A_F(k_1,k_2) e^{j\theta_F(k_1,k_2)}$$

$$G(k_1,k_2) = \sum_{n_1 n_2} g(n_1,n_2) W_{N_1}^{k_1 n_1} W_{N_2}^{k_2 n_2}$$
$$= A_G(k_1,k_2) e^{j\theta_G(k_1,k_2)}$$

$$\begin{cases} -\frac{N_1}{2} \le k_1 \le \frac{N_1}{2}-1, -\frac{N_1}{2} \le k_1 \le \frac{N_1}{2}-1 \\ W_{N_1} = e^{-j2\pi/N_1}, W_{N_2} = e^{-j2\pi/N_2} \\ \sum_{n_1 n_2} \text{represents} \sum_{n_1=-\frac{N_1}{2}}^{\frac{N_1}{2}-1}\sum_{n_2=-\frac{N_2}{2}}^{\frac{N_2}{2}-1}. \end{cases}$$

$A_F(k_1,k_2)$, $A_G(k_1,k_2)$ represents $F(k_1,k_2)$, $G(k_1,k_2)$.
$e^{j\theta_F(k_1,k_2)}$ and $e^{j\theta_G(k_1,k_2)}$ are phase components The cross spectrum is $R(k_1,k_2) = F(k_1,k_2) \overline{G(k_1,k_2)} = A_F(k_1,k_2) A_G(k_1,k_2) e^{j\theta(k_1,k_2)}$ where
$\overline{G(k_1,k_2)}$ is the complex conjugate of $G(k_1,k_2)$
and $\theta(k_1,k_2) = \theta_F(k_1,k_2) - \theta_G(k_1,k_2)$ [Formula 4]

The cross-phase spectrum is $$\hat{R}(k_1,k_2) = \frac{F(k_1,k_2)\overline{G(k_1,k_2)}}{|F(k_1,k_2)\overline{G(k_1,k_2)}|} = e^{j\theta(k_1,k_2)} \quad \text{[Formula 5]}$$

$\hat{R}(k_1,k_2)$ cross-phase spectrum

The inverse discrete Fourier transform of the cross-phase spectrum is a phase-only correlation function, which can be written as $$\hat{r}(n_1,n_2) = \frac{1}{N_1 N_2} \sum_{k_1 k_2} \hat{R}(k_1,k_2) W_{N_1}^{-k_1 n_1} W_{N_2}^{-k_2 n_2} \quad \text{[Formula 6]}$$

$\hat{r}(n_1,n_2)$: phase-only correlation function where $\sum_{k_1 k_2}$ is $\sum_{k_1=-\frac{N_1}{2}}^{\frac{N_1}{2}-1}\sum_{k_2=-\frac{N_2}{2}}^{\frac{N_2}{2}-1}$.

Because f and g should be of the same size, the template is zero-extended to the same size of the search image.

OTHER EXAMPLES (1) If the amount of position mismatch is 1.0 minus the area ratio of a region for calculating the degree of similarity between normalized correlation maps (to the area of each normalized correlation map), the amount of position mismatch can be normalized to a value in the range from 0.0 to 1.0. The amount of position mismatch (1.0−A) normalized to a value in the range from 0.0 to 1.0 can be used to define the composite index value excluding R described above as N+kA where k is a constant representing the amount of position mismatch to be reflected in the composite index value and may be a fixed value or may be allowed to be externally specified by a user. The smaller the amount of position mismatch is and the higher the value of N is, the higher the composite index value is. If two positions have about the same N, one of the positions that has the smaller amount of position mismatch is selected as the matching position. A system using such a composite index value excluding R is as shown in FIG. 1.

Figure 20:
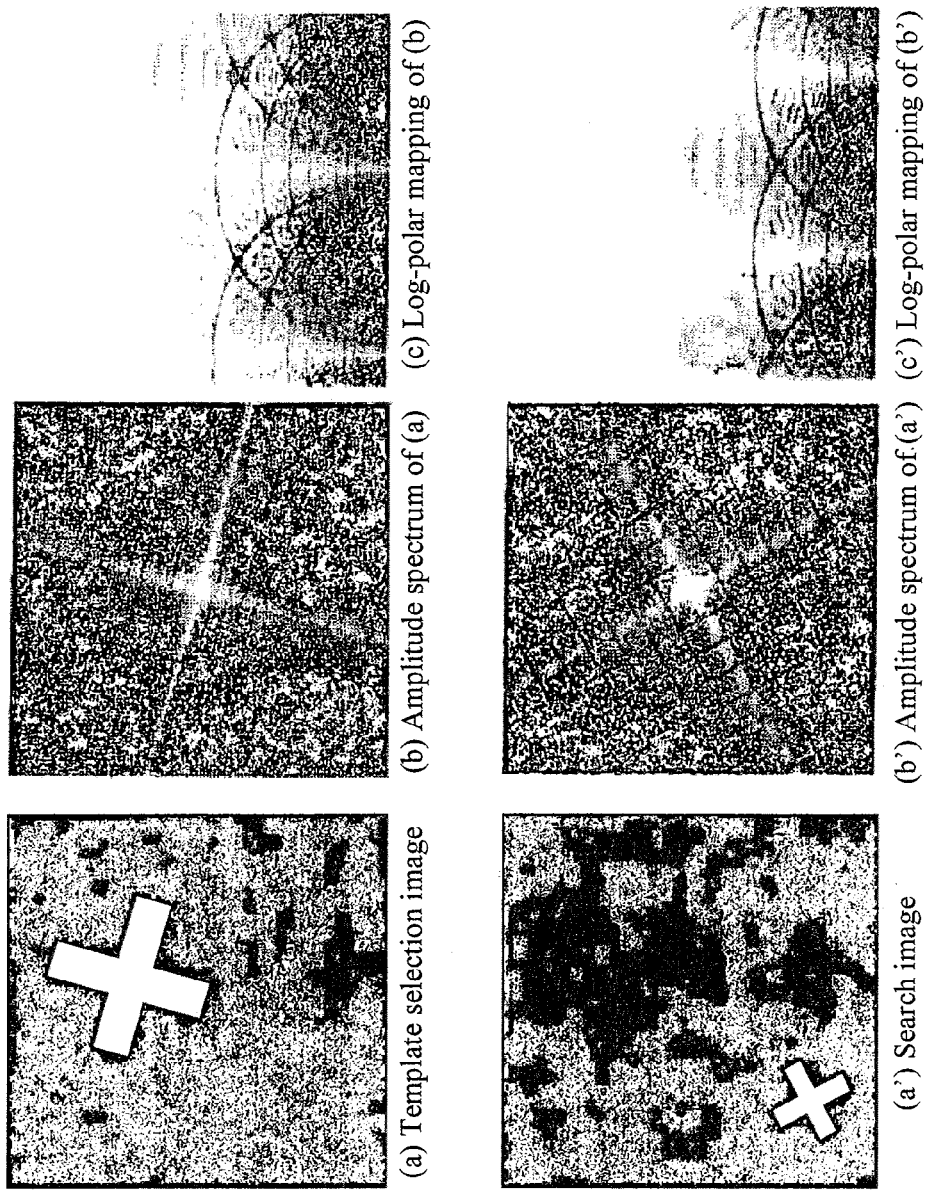
FIG. 20 shows a concept of a method for detecting rotation and scaling between images.

(2) If rotation or scaling occurs between a template selection image and a search image, the amounts of rotation and scaling may be estimated. The method is detailed in "1190944025838_0.pdf", Sei Nagashima, Takafumi Aoki, and Ruriko Tsuneta, Singaku Giho, SIP2005-42, pp. 19-24, June 2005 and is outlined in FIG. 20.

The amplitude spectra of the template selection image and the search image are calculated. Because the amplitude spectra are constant with respect to parallel displacement of the original image, the amplitude spectra reflect only rotation and scaling. When log-polar mapping (polar-coordinate transformation is applied and then logarithm is applied in the radius direction) is applied, rotation can be detected as the amount of parallel displacement in the x-axis direction and scaling can be detected as the amount of parallel displacement in the y-axis direction.

By estimating the amounts of rotation and scaling in this way and applying the amounts of rotation and scaling to the template and neighboring region similarity distribution information, more reliable template matching can be accomplished. In doing so, attention must be paid to the offset of the template.

What is claimed is:
1. An inspection apparatus which obtains a search image and applies template matching to the search image, said inspection apparatus comprising:
a storage device storing first distribution information indicating a distribution of first similarities between a template selection image and a template;

a similarity distribution calculating unit that calculates second distribution information indicating a distribution of second similarities between a search image and the template;

a unit that calculates third similarities between similarity distributions, said third similarities indicating similarities between the first and second distribution information;

a position mismatch amount calculating unit that calculates an amount of position mismatch between the first and second distribution information an integrated index value calculating unit that calculates, for matching candidate positions of the second distribution information, an index value based on the second similarities and the third similarities between the similarity distributions, and carries out an operation in which the smaller the amount of position mismatch is, the larger a rate of the similarities between the similarity distributions in calculating the integrated index value; and a matching position determining unit that determines a matching position on the basis of the integrated index value.

2. The inspection apparatus according to claim 1, wherein the position mismatch amount calculating unit calculates 1.0 minus the ratio of the area of a region for calculating the degree of similarity between normalized correlation maps to the area of each normalized correlation map as the amount of position mismatch.

3. The inspection apparatus according to claim 2, further comprising a user interface for setting a contribution ratio of the third similarities between the similarity distributions when calculating the integrated index value of the amount of position mismatch.

4. The inspection apparatus according to claim 1, wherein the position mismatch amount calculating unit calculates the sum of an amount of position mismatch in the x-direction and an amount of position mismatch in the y-direction as the amount of position mismatch.

5. The inspection apparatus according to claim 1, wherein the position mismatch amount calculating unit outputs the amount of position mismatch in the x-direction or the amount of position mismatch in the y-direction, whichever is greater, as the amount of position mismatch.

6. An inspection method, in an inspection apparatus, of obtaining a search image and applying template matching to the search image; the inspection method comprising the steps of:

a high magnification imaging device acquiring a template selection image of an object;

storing first distribution information indicating a distribution of first similarities between said template in a template selection image and a template;

a high magnification imaging device acquiring a search image of a sample;

a similarity distribution calculating device calculating a second distribution information indicating a distribution of second similarities between the search image and the template;

calculating third similarities between similarity distributions, said third similarities indicating similarities between the first and second distribution information;

a position mismatch amount calculating unit calculating an amount position mismatch between the first and second distribution information;

an integrated index value calculating unit calculating, for matching candidate positions of the second distribution information, an index value based on the second similarities and the third similarities between the similarity distributions, and carrying out an operation in which the smaller the amount of position mismatch is, the larger a rate of the similarities between the similarity distributions in calculating the integrate index value; and determining a matching position on the basis of the integrated index value.

7. The inspection method according to claim 6, wherein the position mismatch amount calculating unit calculates 1.0 minus the ratio of the area of a region for calculating the degree of similarity between normalized correlation maps to the area of each normalized correlation map as the amount of position mismatch.

8. The inspection method according to claim 6, wherein the position mismatch amount calculating unit calculates the sum of an amount of position mismatch in the x-direction and an amount of position mismatch in the y-direction as the amount of position mismatch.

9. The inspection method according to claim 6, wherein the position mismatch amount calculating unit outputs the amount of position mismatch in the x-direction or the amount of position mismatch in the y-direction, whichever is greater, as the amount of position mismatch.

10. The inspection method according to claim 6, further comprising the step of setting, through a user interface, a contribution ratio of the similarities between the first and second similarity distributions when calculating the index value of the amount of position mismatch.

* * * * *